(12) United States Patent
Wang et al.

(10) Patent No.: US 9,465,941 B2
(45) Date of Patent: Oct. 11, 2016

(54) METHOD, SYSTEM, AND APPARATUS FOR DETECTING MALICIOUS CODE

(71) Applicant: Huawei Technologies Co., Ltd., Shenzhen (CN)

(72) Inventors: Peng Wang, Beijing (CN); Peng Yun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 14/162,139

(22) Filed: Jan. 23, 2014

(65) Prior Publication Data
US 2014/0137255 A1 May 15, 2014

Related U.S. Application Data

(63) Continuation of application No. PCT/CN2012/075380, filed on May 11, 2012.

(30) Foreign Application Priority Data

Aug. 9, 2011 (CN) .......................... 2011 1 0226659

(51) Int. Cl.
*G06F 21/53* (2013.01)
*G06F 21/56* (2013.01)

(52) U.S. Cl.
CPC .................................. *G06F 21/566* (2013.01)

(58) Field of Classification Search
CPC combination set(s) only.
See application file for complete search history.

(56) References Cited

U.S. PATENT DOCUMENTS

| 6,775,780 | B1 | 8/2004 | Muttik |
| 7,779,472 | B1 | 8/2010 | Lou |
| 2006/0021029 | A1 | 1/2006 | Brickell et al. |
| 2008/0052709 | A1 | 2/2008 | Tang |

(Continued)

FOREIGN PATENT DOCUMENTS

| CN | 1356631 A | 7/2002 |
| CN | 1961272 A | 5/2007 |

(Continued)

OTHER PUBLICATIONS

Foreign Communication From a Counterpart Application, PCT Application No. PCT/CN2012/075380, English Translation of Chinese Search Report dated Aug. 2, 2012, 4 pages.

(Continued)

*Primary Examiner* — Josnel Jeudy
(74) *Attorney, Agent, or Firm* — Huawei Technologies Co., Ltd.

(57) ABSTRACT

A method, a system, and an apparatus for detecting malicious code to solve the problem that detection efficiency is low and that more resources are occupied. The method includes: monitoring execution of an instruction in a virtual machine supervisor of a host computer, where the instruction is generated in escape mode when a read-write request generated during execution of program code in a virtual machine of the host computer is delivered to the virtual machine supervisor; obtaining execution characteristics of the program code according to execution of the instruction; and comparing the obtained execution characteristics with pre-stored execution characteristics of known malicious code, and determining that the program code is malicious code when the obtained execution characteristics and the pre-stored execution characteristics are the same. This improves the detection efficiency, and saves the storage resources and the processing resources in the host computer.

14 Claims, 12 Drawing Sheets

(56) References Cited

U.S. PATENT DOCUMENTS

| | | |
|---|---|---|
| 2008/0222729 A1 | 9/2008 | Chen et al. |
| 2009/0007100 A1 | 1/2009 | Field et al. |
| 2010/0257608 A1 | 10/2010 | Jeong et al. |
| 2014/0007222 A1* | 1/2014 | Qureshi .................. G06F 21/10 726/16 |

FOREIGN PATENT DOCUMENTS

| | | |
|---|---|---|
| CN | 101131677 A | 2/2008 |
| CN | 101162485 A | 4/2008 |
| CN | 101373502 A | 2/2009 |
| CN | 101827104 A | 9/2010 |
| CN | 101866408 A | 10/2010 |
| CN | 102034050 A | 4/2011 |
| CN | 102082802 A | 6/2011 |
| CN | 102254120 A | 11/2011 |
| WO | 2007076624 A1 | 7/2007 |

OTHER PUBLICATIONS

Foreign Communication From a Counterpart Application, PCT Application No. PCT/CN2012/075380, English Translation of Chinese Written Opinion dated Aug. 2, 2012, 14 pages.

Foreign Communication From a Counterpart Application, Chinese Application No. 201110226659.5, Chinese Office Action dated May 16, 2013, 11 pages.

Foreign Communication From a Counterpart Application, Chinese Application No. 201110226659.5, Chinese Office Action dated Dec. 17, 2012, 9 pages.

Foreign Communication From a Counterpart Application, Chinese Application No. 201110226659.5, Chinese Search Report dated Nov. 30, 2012, 2 pages.

Yu, G., et al., "Distributed Structure-Based Intelligent Network Malicious Code Analysing System," Institiute of Information Engineering, Computer Applications and Software, vol. 27, No. 5, May 2010, pp. 121-124.

Partial English Translation and Abstract of Chinese Patent Application No. CN1356631A, May 26, 2014, 6 pages.

Partial English Translation and Abstract of Chinese Patent Application No. CN102082802A, May 26, 2014, 5 pages.

Partial English Translation and Abstract of Chinese Patent Application No. CN101162485A, May 26, 2014, 8 pages.

Partial English Translation and Abstract of Chinese Patent Application No. CN102034050A, May 26, 2014, 6 pages.

Partial English Translation and Abstract of Chinese Patent Application No. CN101827104A, May 26, 2014, 5 pages.

Partial English Translation and Abstract of Chinese Patent Application No. CN102254120A, Part 1, Mar. 3, 2014, 10 pages.

Partial English Translation and Abstract of Chinese Patent Application No. CN102254120A, Part 2, Mar. 3, 2014, 3 pages.

Partial English Translation and Abstract of Chinese Patent Application No. CN101866408, Part 1, Aug. 28, 2012, 12 pages.

Partial English Translation and Abstract of Chinese Patent Application No. CN101866408, Part 2, Aug. 28, 2012, 3 pages.

* cited by examiner

METHOD, SYSTEM, AND APPARATUS FOR DETECTING MALICIOUS CODE

CROSS-REFERENCE TO RELATED APPLICATION

This application is a continuation of International Application No. PCT/CN2012/075380, filed on May 11, 2012, which claims priority to Chinese Patent Application No. 201110226659.5, filed on Aug. 9, 2011, both of which are hereby incorporated by reference in their entireties.

FIELD

The present invention relates to the field of computer security technologies, and in particular, to a method for detecting malicious code, a host computer, an apparatus for detecting malicious code, and a system for detecting malicious code.

BACKGROUND

The hardware virtualization technology is widely applied to fields, such as software testing and parallel computing. One or more virtual machines are created on one physical host by using the hardware virtualization technology, so that several or even tens of virtual machines share hardware resources of one physical host. Therefore, the physical host is also called a host computer.

Cloud computing centralizes data processing tasks of terminal devices and delivers the tasks to a network for execution, so that the network provides data services for users using a plurality of different terminal devices. In this way, differences of terminal devices are overcome. Distributed computing at the network side in the cloud computing becomes a new important application scenario of the hardware virtualization technology. Virtual machines on the same host computer may generate data interaction only by using a public host computer other than using a network device. Therefore, when the cloud computing is implemented by using the hardware virtualization technology, a virtual machine infected by a virus easily infects, through the host computer, other virtual machines on the same host computer. Therefore, the cloud computing is easily subject to computer viruses and network attacks.

Regarding how to detect malicious code (Malware) including the virus in the above scenario, the prior art proposes respectively installing antivirus software on each of the virtual machines on the same host computer, and detecting and removing the malicious code on the virtual machines by using the antivirus software installed in the virtual machines.

During the implementation of the present invention, the inventors find that the prior art has at least the following disadvantages: when the malicious code is executed, damage is actually caused to physical hardware such as the memory and CPU of the host computer instead of logical virtual machines. However, in the solution of the prior art, it is required that all virtual machines on the same host computer be installed with antivirus software respectively, and that malicious code detection be performed on the virtual machines. Consequently, this solution has the following problems: the efficiency of detecting malicious code is low, and more storage resources and processing resources of the host computer are occupied.

SUMMARY

Embodiments of the present invention provide a method for detecting malicious code to solve the problem that detection efficiency is low and that more resources are occupied in the prior art.

Correspondingly, the embodiments of the present invention further provide a host computer, an apparatus for detecting malicious code, and a system for detecting malicious code.

The technical solutions provided in the embodiments of the present invention are as follows:

A method for detecting malicious code includes: monitoring execution of an instruction in a virtual machine supervisor of a host computer, where the instruction is generated in escape mode when a read-write request generated during execution of program code in a virtual machine of the host computer is delivered to the virtual machine supervisor; obtaining execution characteristics of the program code according to execution of the instruction; and comparing the obtained execution characteristics with pre-stored execution characteristics of known malicious code, and determining that the program code is malicious code when the obtained execution characteristics and the pre-stored execution characteristics are the same.

A method for detecting malicious code includes: receiving program code sent by a host computer, executing the program code in a pre-constructed first sandbox for simulating an environment of a virtual machine supervisor, and obtaining a security state report of the first sandbox after the program code is executed; and/or executing the program code in a pre-constructed second sandbox for simulating an environment of a virtual machine, and obtaining a security state report of the second sandbox after the program code is executed; determining, according to values of preset parameters in the security state report and a set of preset determination rules, whether the program code is malicious code, where the determination rules include a threshold determination range for at least one of the preset parameters; and sending a determination result to the host computer.

A host computer includes a virtual machine supervisor and at least one virtual machine, and further includes an apparatus for detecting malicious code, where the apparatus for detecting malicious code is configured to monitor execution of an instruction in the virtual machine supervisor of the host computer, where the instruction is generated in escape mode when a read-write request generated during execution of program code in a virtual machine of the host computer is delivered to the virtual machine supervisor; obtain execution characteristics of the program code according to execution of the instruction; and compare the execution characteristics obtained by the obtaining unit with pre-stored execution characteristics of known malicious code, and determine that the program code is malicious code when the obtained execution characteristics and the pre-stored execution characteristics are the same.

An apparatus for detecting malicious code includes: a monitoring unit configured to monitor execution of an instruction in a virtual machine supervisor of a host computer, where the instruction is generated in escape mode when a read-write request generated during execution of program code in a virtual machine of the host computer is delivered to the virtual machine supervisor; an obtaining unit configured to obtain execution characteristics of the program code according to execution of the instruction; and a determining unit configured to compare the execution characteristics obtained by the obtaining unit with pre-stored execution characteristics of known malicious code, and determine that the program code is malicious code when the obtained execution characteristics and the pre-stored execution characteristics are the same.

An apparatus for detecting malicious code includes: a first receiving unit configured to receive program code sent by a host computer; an executing unit configured to execute the program code in a pre-constructed first sandbox for simulating an environment of a virtual machine supervisor, and obtain a security state report of the first sandbox after the program code is executed; and/or execute the program code in a pre-constructed second sandbox for simulating an environment of a virtual machine, and obtain a security state report of the second sandbox after the program code is executed; a determining unit configured to determine, according to values of preset parameters in the security state report and a set of preset determination rules, whether the program code is malicious code, where the determination rules include a threshold determination range for at least one of the preset parameters; and a first sending unit configured to send a determination result obtained by the determining unit to the host computer.

A system for detecting malicious code includes at least one host computer and at least one cluster antivirus device, where the host computer is configured to capture an instruction in a virtual machine supervisor of the host computer, where the instruction is generated in escape mode when a read-write request generated during execution of program code in a virtual machine of the host computer is delivered to the virtual machine supervisor; obtain execution characteristics of the program code according to execution of the instruction; compare the obtained execution characteristics with execution characteristics of known malicious code in a blacklist in a local database, and determine that the program code is malicious code when the obtained execution characteristics and the pre-stored execution characteristics are the same; when the obtained execution characteristics and the pre-stored execution characteristics are different, send the program code to the cluster antivirus device and receive a determination result returned by the cluster antivirus device about whether the program code is malicious code; and the cluster antivirus device is configured to receive the program code sent by the host computer, execute the program code in a pre-constructed first sandbox for simulating an environment of a virtual machine supervisor, and obtain a security state report of the first sandbox after the program code is executed; and/or execute the program code in a pre-constructed second sandbox for simulating an environment of a virtual machine, and obtain a security state report of the second sandbox after the program code is executed; determine, according to values of preset parameters in the security state report and a set of preset determination rules, whether the program code is malicious code, where the determination rules include a parameter value range for at least one of the preset parameters; and send the determination result to the host computer.

By using the method for detecting malicious code according to the embodiments of the present invention, the instruction generated in escape mode is monitored in the virtual machine supervisor of the host computer, and the execution characteristics of the program code are obtained according to the instruction; the obtained execution characteristics are compared with the pre-stored execution characteristics of known malicious code, and it is determined whether the program code is malicious code according to the comparison result. This improves the detection efficiency, and saves the storage resources in the host computer that are occupied by installing antivirus software in each virtual machine repeatedly, and the processing resources in the host computer that are occupied by running the antivirus software in each virtual machine.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. The accompanying drawings in the following description merely show some embodiments of the present invention, and persons of ordinary skill in the art can derive other drawings from these accompanying drawings without creative efforts.

DETAILED DESCRIPTION OF THE EMBODIMENTS

When malicious code is executed on a virtual machine, both the operation of reading and writing the memory of a host computer by the malicious code, and the operation of accessing the CPU are forwarded by a virtual platform to physical hardware of the host computer. Therefore, when the malicious code is executed, damage is actually caused to physical hardware such as the memory and the CPU of the host computer instead of logical virtual machines. However, in the prior art, the solution for detecting malicious code on a virtual machine requires that all virtual machines on the same host computer be installed with antivirus software respectively, and that malicious code detection be performed on the virtual machines respectively. Consequently, the prior art has the following problems: the detection efficiency is low, and more resources of the host computer are occupied.

In addition, during antivirus software upgrade, antivirus software needs to be synchronously upgraded on all virtual machines. Otherwise, a virtual machine with the antivirus software of a lower version may still be infected by malicious code. Therefore, the prior art has the problem that management, upgrade, and maintenance are complex.

Embodiments 1 to 5 of the present invention describe a method for detecting malicious code from the perspective of a host computer. Embodiments 6 and 7 describe a method for detecting malicious code from the perspective of a cluster antivirus device.

The following describes major principles, implementation modes, and benefits of the technical solutions provided in the embodiments of the present invention with reference to the accompanying drawings.

Embodiment 1

Figure 1:
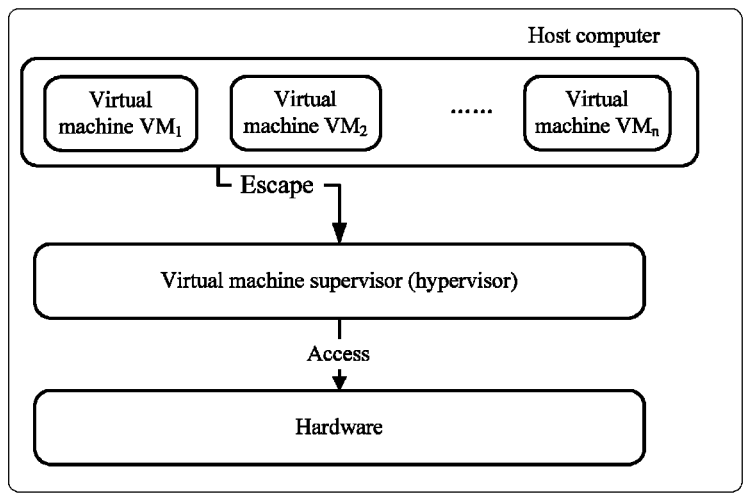
FIG. 1 is a schematic diagram illustrating a structure and principle of a host computer in a scenario of hardware virtualization according to an embodiment of the present invention.

FIG. 1 is a schematic diagram illustrating the structure and principle of a host computer in a scenario of hardware virtualization according to an embodiment of the present invention. For ease of description, a host computer herein is abstracted to have a three-layer logical architecture, namely, virtual machines $VM_1$-$VM_n$ at an upper layer, a virtual machine supervisor (hypervisor) at an intermediate layer, and bottom layer hardware. The bottom layer hardware includes a center processing unit (CPU), a memory, a network adapter, and a hard disk.

Figure 2A:
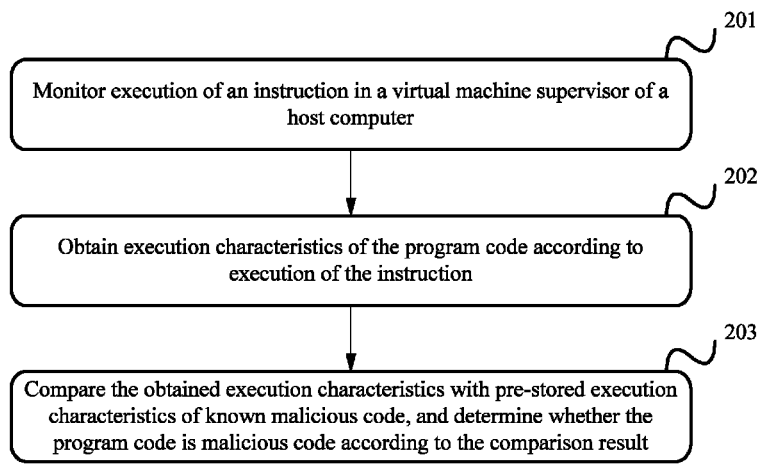
FIG. 2A is a flowchart of a method for detecting malicious code according to Embodiment 1 of the present invention.

Referring to FIG. 2A, a process of a method for detecting malicious code according to this embodiment of the present invention is described in detail.

Step 201: Monitor execution of an instruction in a virtual machine supervisor of a host computer.

Specifically, when program code is executed on a virtual machine, and a read-write request directed to all types of physical hardware devices is delivered to the virtual machine supervisor, the read-write request will be formed in escape mode into an instruction executed in the virtual machine supervisor of the host computer where the virtual machine is located, and the physical hardware devices are accessed by using the virtual machine supervisor.

The operation in escape mode is a function of the existing virtual machine supervisor. In the operation in escape mode, the access of the virtual machine to virtual hardware devices is converted into access of the virtual machine supervisor to physical hardware devices. It is an indispensable step during execution of the program code in the virtual machine. The technical details are not described herein.

It should be noted that, according to this embodiment of the present invention, the monitoring execution of the instruction in the virtual machine supervisor of the host computer refers to monitoring execution of an escaped instruction in the virtual machine supervisor, but not execution of the program code before escaping in the virtual machine.

Step 202: Obtain execution characteristics of the program code according to execution of the instruction.

The execution characteristics of the program code include the content of the instruction generated in escape mode from the read-write request generated during execution of the program code, a behavior characteristic of the instruction in the virtual machine supervisor, or a behavior characteristic of the instruction during access to the physical hardware device.

The behavior characteristic of the instruction in the virtual machine supervisor includes modification of the content of a system file in the virtual machine supervisor, modification of the storage location of a system file in the virtual machine supervisor, or modification of parameter information of a system file in the virtual machine supervisor. The file parameter information includes a name identifier, generation time, a version number, and access rights to the system file.

The behavior characteristic of the instruction during access to the physical hardware device includes duration when access to storage space of a storage device, such as a memory, a hard disk, or a flash memory, exceeds a first preset threshold, duration when CPU usage exceeds a second preset threshold, or whether to read and write an input/output interface within a specified range. Optionally, the first preset threshold may be obtained by collecting statistics of access to the storage device by the instruction generated in escape mode from the known malicious code in advance, and the second preset threshold may be obtained by collecting statistics of CPU usage during execution of the instruction generated in escape mode from the known malicious code in advance.

Figure 2B:
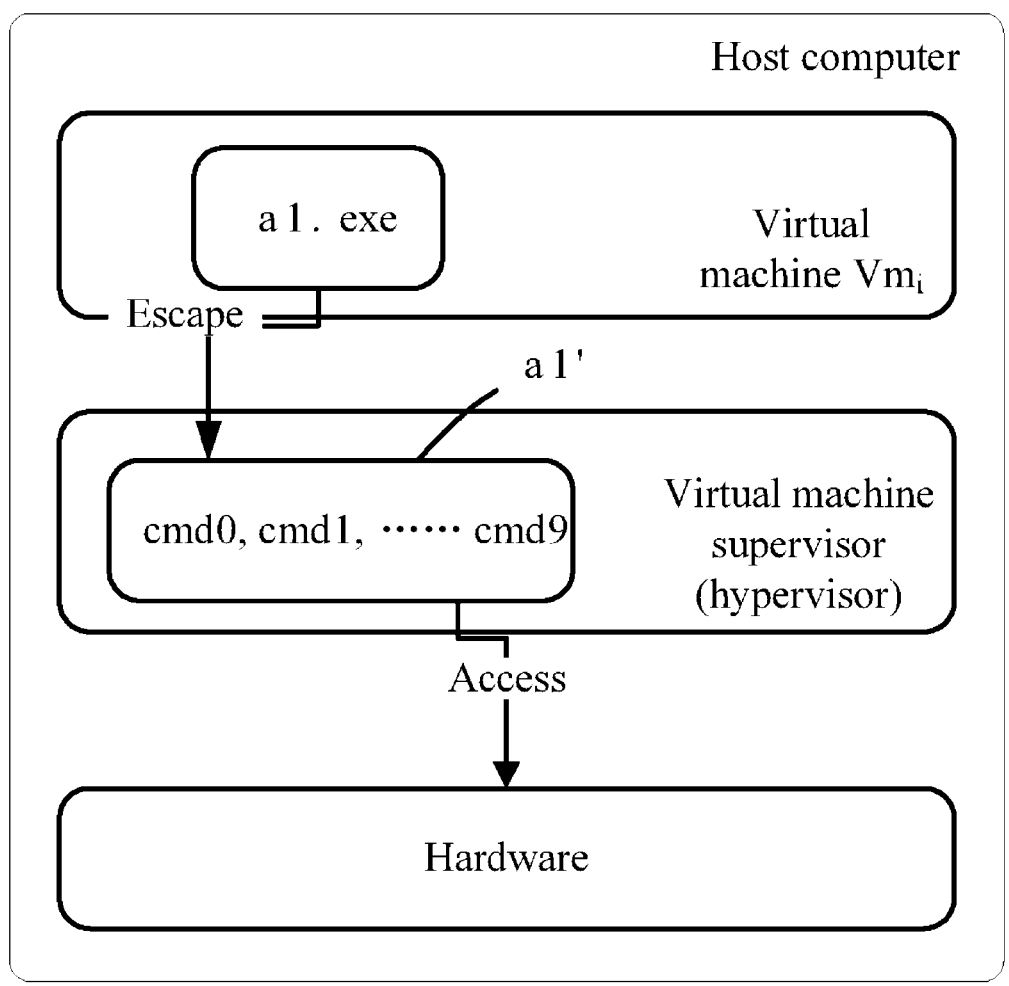
FIG. 2B is a schematic diagram of an example for obtaining execution characteristics of program code according to Embodiment 1 of the present invention.

With reference to the example illustrated in FIG. 2B, the following describes the specific process of obtaining the execution characteristics of the program code.

A read-write request set generated during execution of program code a1.exe in the virtual machine is formed into an instruction set a1' in escape mode. The instruction set a1' includes 10 instructions including cmd0-cmd9.

The content (shown in Table 1) of the instruction generated in escape mode from the read-write request during the execution of the program code may be obtained by reading the content of the monitored instruction. Optionally, a part of the content may be read. For example, the read content of cmd1 is "0x195fd3" and the read content of cmd6 is "0x13457e".

TABLE 1

| Instruction Identifier | Instruction Content |
| --- | --- |
| cmd0 | 0x19256d |
| cmd1 | 0x195fd3 |
| cmd2 | 0x193546 |
| cmd3 | 0x45678f |
| cmd4 | . . . |
| cmd5 | . . . |
| cmd6 | 0x13457e |
| cmd7 | . . . |
| cmd8 | . . . |
| cmd9 | . . . |

Optionally, the behavior characteristic of the instruction generated in escape mode in the virtual machine supervisor or the behavior characteristic of the instruction during access to the physical hardware device may be obtained in the following way:

Monitor whether a predetermined application programming interface (API) in the virtual machine supervisor, for example, a file system API, or an input/output operation API, is invoked by the instruction generated in escape mode; if the API is invoked by any instruction of cmd1-cmd9 generated in escape mode, obtain the behavior characteristic of the instruction generated in escape mode in the virtual machine supervisor or the behavior characteristic of the instruction during access to the physical hardware device according to a parameter input when the API is invoked by the instruction. The input parameter includes file parameter information such as a file path and a file identifier, or the identifier of an interface to be read or written, or the data of an interface to be read or written. For example, it may be acquired, according to the parameter input when the file system API is invoked by cmd2, that cmd2 is to modify the content of a system file named xen.gz in the path /boot/.

In addition, the usage of storage resources or processing resources on the host computer is obtained by monitoring the predetermined API during execution of the instruction. In this way, the behavior characteristic of the instruction during access to the hardware is obtained, for example, the size of storage space of the storage device and CPU usage.

Step 203: Compare the obtained execution characteristics with pre-stored execution characteristics of known malicious code, and determine whether the program code is malicious code according to the comparison result.

The specific comparison mode may be set based on a comprehensive consideration of factors, such as the requirement on the security level and processing performance of the host computer. For example, if the requirement on the security level is high, the comparison mode may be set as follows: as long as at least one execution characteristic of the obtained execution characteristics is the same as one execution characteristics of the known malicious code, the execution characteristics are considered to be the same as those of the known malicious code, and the program code is determined as malicious code. For example, as long as the identifier of the program code is the same as the identifier of the known malicious code, the program code is determined as malicious code. Or, if the processing performance of the host computer is low, the comparison mode may be set as follows: only execution characteristics that are easily obtained are compared with the execution characteristics of the known malicious code; and if the execution characteristics that are easily obtained are the same as the execution characteristics of the known malicious code, the execution characteristics of the program code are considered to be the same as the execution characteristics of the known malicious code, and the program code is determined as malicious code; otherwise, the execution characteristics of the program code are considered to be different from the execution characteristics of the known malicious code, and the program code is not determined as malicious code. For example, only the identifier of the program code, digital signature, and issuer identifier are compared; and execution characteristics that are hard to obtain are not compared, for example, the behavior characteristic during access to the physical hardware device. The details are not exhaustively described here.

The comparison process includes but is not limited to:

Process 1: The host computer stores a blacklist in a local database, where the blacklist includes execution characteristics of known malicious code.

The host computer compares the obtained execution characteristics of the program code with execution characteristics of known malicious code in the blacklist in the local database. If the obtained execution characteristics are the same as the execution characteristics of the known malicious code in the blacklist, the host computer determines that the program code is malicious code; otherwise, the host computer determines that the program code is not malicious code.

For example, the blacklist includes execution characteristics of known malicious code malware1.exe, malware2.exe, and malware3.exe. The host computer compares the obtained execution characteristics of program code a1.exe with the execution characteristics of the three malicious codes in the blacklist one by one. Comparison of the execution characteristics of the program code a1.exe with those of malware1.exe is used as an example for description.

The execution characteristics of known malicious code malware1.exe include the following:

(1) The content of cmd1 in an instruction set malware1' generated in escape mode is "0x195fd3", and the content of cmd6 is "0x13457e".

(2) A behavior characteristic of an instruction generated in escape mode in the virtual machine supervisor is "modifying the content of a system file named xen.gz in the path /boot/".

The contents of cmd1 and cmd6 in the instruction set a1 generated in escape mode during execution of the program code a1.exe are compared with the contents of cmd1 and cmd6 in the instruction set malware1', and the behavior characteristic of an instruction in the instruction set a1' in the virtual machine supervisor is compared with the behavior characteristic of an instruction in malware1' in the virtual machine supervisor; the comparison result indicates that the contents of cmd1 and cmd6 are the same as the contents of cmd1 and cmd6 in the instruction set malware1, and that the behavior characteristic of the instruction in the instruction set a1' in the virtual machine supervisor and the behavior characteristic of the instruction in malware1' in the virtual machine supervisor are both "modifying the content of a system file named xen.gz in the path /boot/". Therefore, the comparison result is that the execution characteristics of program code a1.exe are the same as the execution characteristics of malicious code malware1.exe, which indicates that program code a1.exe is malicious code.

Optionally, the local database may be periodically updated.

Optionally, when the comparison result indicates that the execution characteristics are different, the user may be prompted to determine whether to run the program code.

Optionally, steps 201-203 may be performed by an apparatus for detecting malicious code in the host computer.

By using the method for detecting malicious code according to the embodiment of the present invention, the instruction generated in escape mode is monitored in the virtual machine supervisor of the host computer, and the execution characteristics of the program code are obtained according to the instruction; the obtained execution characteristics are compared with the pre-stored execution characteristics of malicious code, and it is determined whether the program code is malicious code according to the comparison result. In this way, antivirus software does not need to be installed on each virtual machine, thereby improving the detection efficiency, reducing the storage resources in the host computer that are occupied by installing antivirus software repeatedly, and the processing resources in the host computer that are occupied by running the antivirus software in each virtual machine.

Embodiment 2

Figure 3:
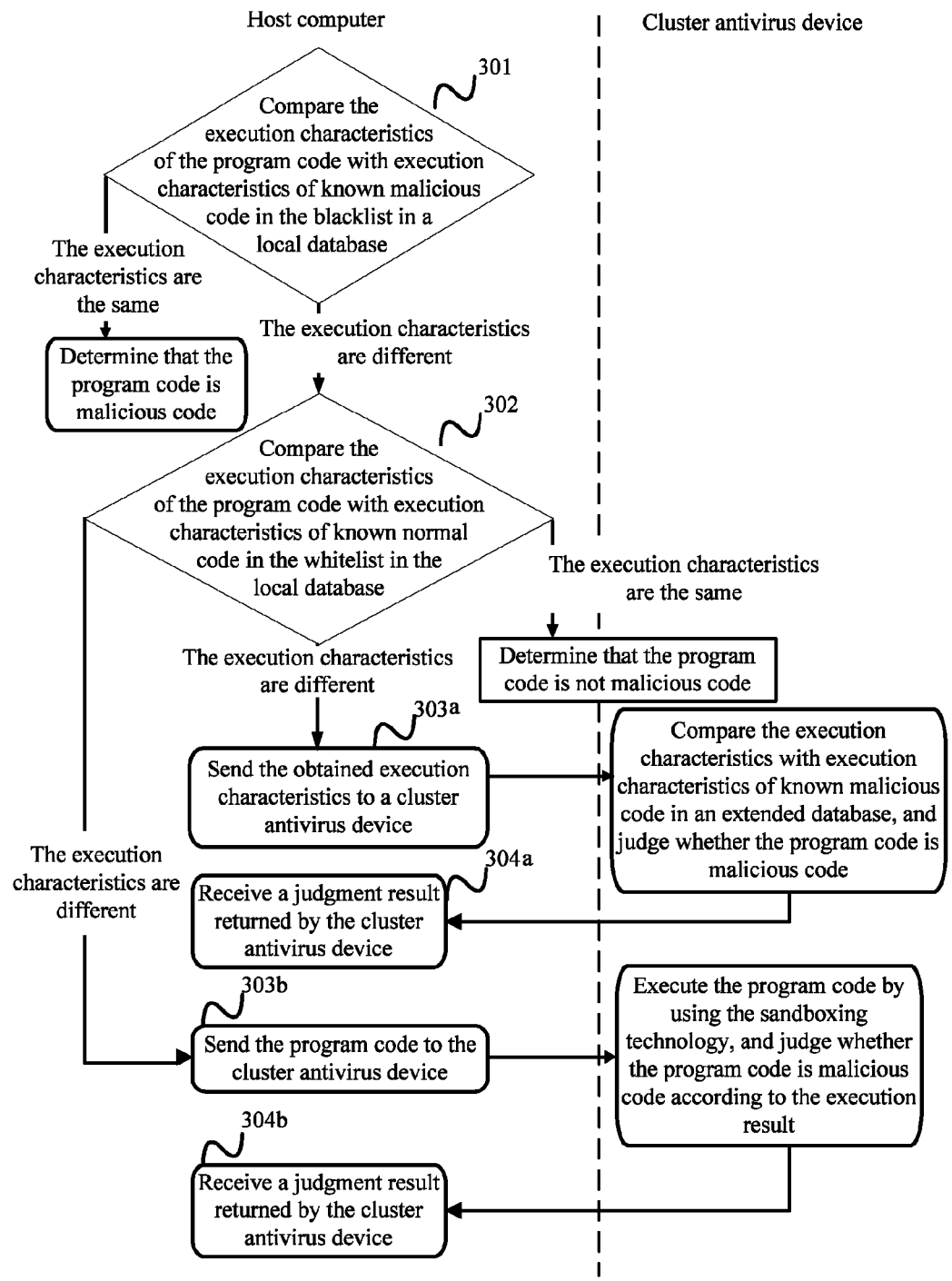
FIG. 3 is a flowchart of a method for determining malicious code according to Embodiment 2 of the present invention.

To improve accuracy of detecting malicious code, this embodiment provides another process of determining whether the program code is malicious code in step 203 according to Embodiment 1. A whitelist is further stored in the local database of a host computer. The host computer determines whether the program code is malicious code according to comparison using the blacklist and whitelist. When failing to determine whether the program code is malicious code according to the comparison result using the local database, the host computer sends the execution characteristics or the program code to the cluster antivirus device for determination, and receives a determination result returned by the cluster antivirus device. The details are shown in FIG. 3.

Both a blacklist and a whitelist are stored in the local database of a host computer. The whitelist contains execution characteristics of known normal code.

Step 301: The host computer compares the obtained execution characteristics of the program code with execution characteristics of known malicious code in the blacklist in the local database for the first time. If the execution characteristics are the same, the host computer determines that the program code is malicious code; otherwise, step 302 is performed.

For the specific comparison mode according to this embodiment, reference may be made to Embodiment 1.

Step 302: If the first comparison result indicates that the execution characteristics are different, the host computer compares the obtained execution characteristics with execution characteristics of known normal code in the whitelist in the local database for a second time.

If the second comparison result indicates that the execution characteristics are the same, the host computer determines that the program code is not malicious code.

If the second comparison result indicates that the execution characteristics are different, step 303a or step 303b is performed.

Step 303a: The host computer sends the obtained execution characteristics to the cluster antivirus device, and step 304a is performed.

Step 304a: The host computer receives the determination result returned by the cluster antivirus device about whether the program code is malicious code, where the determination result is determined after the cluster antivirus device compares the characteristics with the execution characteristics of the known malicious code in an extended database of the cluster antivirus device.

Compared with the host computer, the cluster antivirus device is capable of comparing the execution characteristics sent by the host computer with the execution characteristics of the known malicious code in the blacklist in an extended database by using the advantage of computing performance of the distributed computing technology or the advantage of the storage capacity of the distributed storage, to obtain the determination result. The specific comparison mode is similar to that used by the host computer, and is not repeatedly described herein.

Step 303b: The host computer sends the program code to the cluster antivirus device, and step 304b is performed.

Step 304b: The host computer receives the determination result returned by the cluster antivirus device about whether the program code is malicious code, where the determination result is determined according to an execution result after the cluster antivirus device executes the program code by using the sandboxing technology or other technologies similar to sandboxing.

The sandboxing (or referred to as the sand table) technology is an existing virtualized security isolation technology. This technology restricts the execution environment of program behaviors according to a security policy. The program code running in the sandbox cannot modify or view the user system. The cluster antivirus device executes suspicious code by using the sandboxing technology, and provides a determination result indicating whether the suspicious code is malicious code according to the execution result.

Optionally, the above steps may be performed by an apparatus for detecting malicious code in the host computer.

Further, in steps 303a and 303b, the apparatus for detecting malicious code may instruct the virtual machine executing the program code to send the program code to the cluster antivirus device. For example, the apparatus for detecting malicious code may send a notification message to an antivirus proxy in the virtual machine to instruct the virtual machine to send the program code to the cluster antivirus device. The apparatus for detecting malicious code may also obtain the program code from the virtual machine, and send the obtained program code to the cluster antivirus device. For example, the apparatus for detecting malicious code may send a request message to the antivirus proxy in the virtual machine, and obtain the program code from a corresponding response message received.

In addition to the comparison solutions for the host computer provided in Embodiment 1 and this embodiment, other comparison solutions may also be used. For example, the host computer first compares the obtained execution characteristics of the program code with the execution characteristics in the whitelist, and compares the obtained execution characteristics of the program code with the execution characteristics in the blacklist for a second time when the first comparison result indicates that the execution characteristics are different; or concurrently compares the execution characteristics of the program code with the execution characteristics of the known malicious code in the blacklist and the execution characteristics of the known normal code in the whitelist respectively. The details are not exhaustively described.

In addition, in this embodiment of the present invention, the whitelist may not be stored in the local database or the execution characteristics may not be compared with those in the whitelist. When the comparison result in step 301 indicates that the execution characteristics are different, step 302 may be skipped, and step 303a or step 303b is directly performed. In this way, storage space occupied by the local database is reduced. However, this may result in that more messages are exchanged between the host computer and the cluster antivirus device. In practice, a proper solution may be flexibly selected according to factors such as storage resources of the host computer and network transmission resources.

By using the method for detecting malicious code according to this embodiment of the present invention, when failing to determine, according to the comparison result using the local database, whether the program code is malicious code, the host computer sends the execution characteristics or the program code to the cluster antivirus device for determination, and receives a determination result returned by the cluster antivirus device. Whether the program code sent by the host computer is malicious code is determined by using the performance advantage of a distributed computing system of the cluster antivirus device, and according to the extended database or the sandbox, which improves accuracy of detecting malicious code.

Embodiment 3

In Embodiment 2, compared with the determination mode using the sandbox in steps 303b and 304b, the determination mode using the distributed behavior characteristic in steps 303a and 304a has high processing efficiency. However, in this mode, new malicious code that has not appeared cannot be identified. In the determination mode using the sandbox in steps 303b and 304b, new malicious code that has not appeared can be identified, but the processing efficiency is low. To ensure high processing efficiency and a capability of identifying new malicious code by combining the advantages of the two determination modes, this embodiment further provides a method of comparing the execution characteristics of the program code with pre-stored execution characteristics of known malicious code, and determining whether the program code is malicious code according to the comparison result. The detailed process is illustrated in FIG. 4A.

Figure 4A:
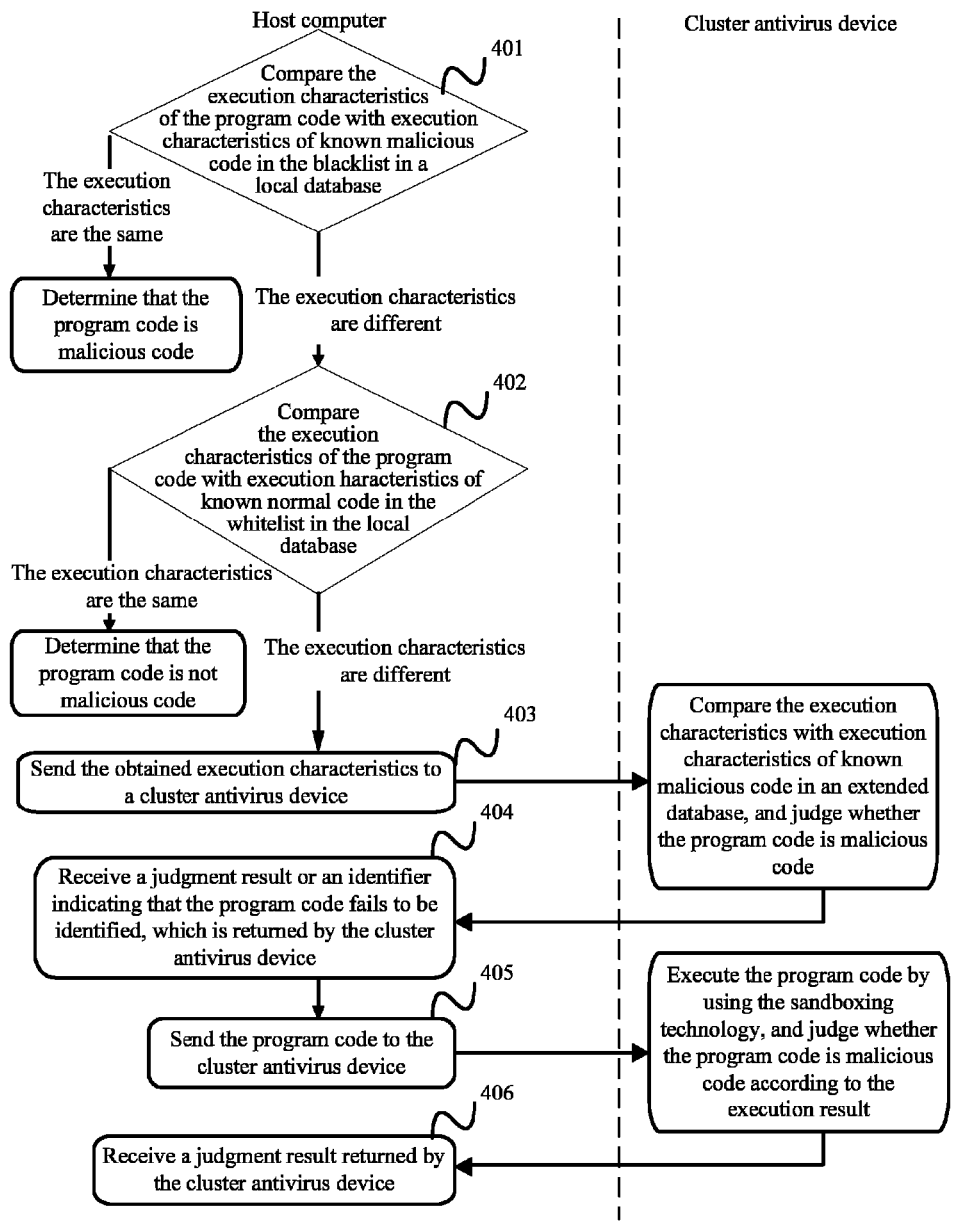
FIG. 4A is a flowchart of a method for determining malicious code according to Embodiment 3 of the present invention.

In FIG. 4A, step 401 is similar to step 301 illustrated in FIG. 3, and step 402 is similar to step 302 illustrated in FIG. 3.

Step 401: The host computer compares the obtained execution characteristics of the program code with execution characteristics of known malicious code in the blacklist in the local database for the first time. If the execution characteristics are the same, the host computer determines that the program code is malicious code; otherwise, step 402 is performed. For the specific comparison mode in this embodiment, reference may be made to Embodiment 1.

Step 402: If the first comparison result indicates that the execution characteristics are different, the host computer compares the obtained execution characteristics with execution characteristics of known normal code in the whitelist in the local database for a second time.

If the second comparison result indicates that the execution characteristics are the same, the host computer determines that the program code is not malicious code.

If the second comparison result indicates that the execution characteristics are different, step 403 is performed.

Step 403: The host computer sends the obtained execution characteristics to the cluster antivirus device.

Step 404: The host computer receives the determination result about whether the program code is malicious code or not malicious code, or an identifier indicating that the program code fails to be identified, which is returned by the cluster antivirus device. If the host computer receives the identifier indicating that the program code fails to be identified, step 405 is performed.

If the cluster antivirus device determines that the received execution characteristics are the same as the execution characteristics of known malicious code in the blacklist in an extended database, the cluster antivirus device determines that the program code is malicious code, and returns the determination result indicating that the program code is malicious code.

If the cluster antivirus device determines that the received execution characteristics are the same as the execution characteristics of known normal code in the whitelist in the extended database, the cluster antivirus device determines that the program code is not malicious code, and returns the determination result indicating that the program code is not malicious code.

If the cluster antivirus device determines that the received execution characteristics are different from both the execution characteristics of the known malicious code in the blacklist in the extended database and the execution characteristics of the known normal code in the whitelist in the extended database, the cluster antivirus device returns the identifier indicating that the program code fails to be identified.

Step 405: The host computer sends the program code to the cluster antivirus device.

Step 406: The host computer receives the determination result returned by the cluster antivirus device about whether the program code is malicious code, where the determination result is determined according to an execution result after the cluster antivirus device executes the program code by using the sandboxing technology.

Figure 4B:
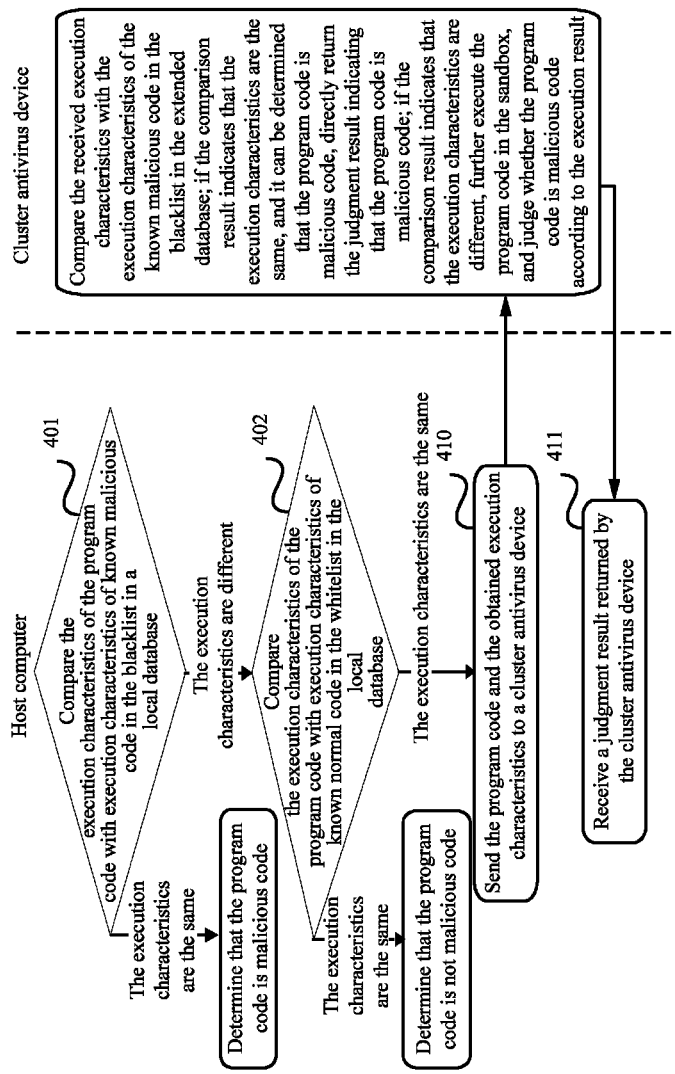
FIG. 4B is a flowchart of another method for determining malicious code according to Embodiment 3 of the present invention.

Referring to FIG. 4B, the method for detecting malicious code according to this embodiment of the present invention may be adjusted as follows: Steps 403-406 illustrated in FIG. 4A are replaced by steps 410-411.

Step 410: The host computer sends the program code and the obtained execution characteristics to the cluster antivirus device.

The cluster antivirus device may first compare the received execution characteristics with the execution characteristics of the known malicious code in the blacklist in the extended database. If the comparison result indicates that the execution characteristics are the same, and it can be determined that the program code is malicious code, the cluster antivirus device directly returns the determination result indicating that the program code is malicious code. If the comparison result indicates that the execution characteristics are different, the cluster antivirus device further executes the program code in the sandbox, and determines whether the program code is malicious code according to the execution result.

Step 411: The host computer receives the determination result returned by the cluster antivirus device.

Embodiment 4

In Embodiments 1-3, when the host computer determines, according to the local database or the determination result returned by the cluster antivirus device, that the program code is malicious code, the method further includes impeding execution of the instruction generated in escape mode from the read-write request of the program code.

Optionally, the instruction generated in escape mode from the read-write request of the program code may also be isolated, or the user is prompted to delete the program code.

When it is determined that the program code is not malicious code, the method further includes continuously executing the instruction generated in escape mode from the read-write request of the program code.

According to this embodiment of the present invention, after the host computer detects the malicious code, execution of the instruction generated in escape mode from the read-write request may be impeded. This solves the problem that the malicious code is transmitted between multiple virtual machines in the host computer, and enhances the security.

Embodiment 5

Figure 5:
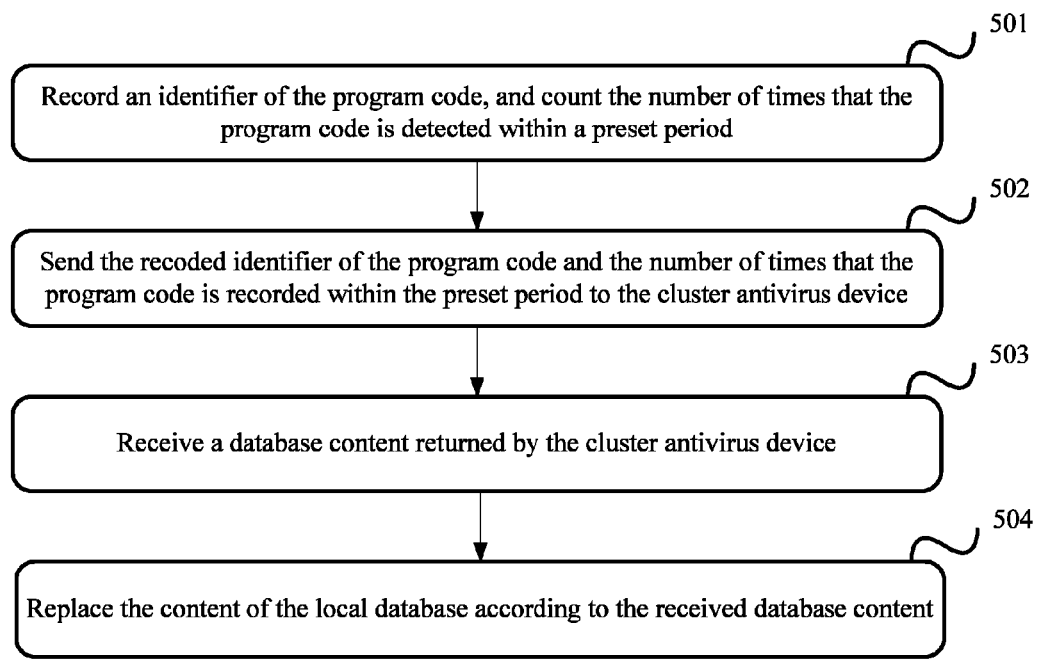
FIG. 5 is a flowchart of a method for updating a local database in a host computer according to Embodiment 5 of the present invention.

Referring to FIG. 5, in Embodiments 1-4, if the host computer determines, according to the local database or the determination result returned by the cluster antivirus device, that the program code is malicious code, the method further includes:

Step 501: Record an identifier of the program code, and count the number of times that the identifier of the program code is detected within a preset period, where the preset period may be determined according to factors such as a history record of the detection frequency of the malicious code, or the performance of the host computer.

Step 502: Periodically or aperiodically send the recoded identifier of the program code and the number of times that the program code is recorded within the preset period to the cluster antivirus device.

Step 503: Receive a database content returned by the cluster antivirus device, where the received database content is determined by the cluster antivirus device according to the identifier of the program code and the number of times that are sent by the host computer.

Step 504: Replace the content of the local database according to the received database content to update the local database.

Optionally, the received database content is updated by the cluster antivirus device according to a preset geographic region, or the identifier of the program code and the recorded number of times that are sent by the host computers in a network region (for example, a local area network, the network of a university, or the network of a city).

By using the above solution, the local database of the host computer is timely updated. This, in one aspect, improves the accuracy of detecting malicious code according to Embodiment 1 and in another aspect, increases the probability that the host computer determines that the program code is malicious code by comparing the obtained execution characteristics of the program code with the execution characteristics of the malicious code in the blacklist in the local database. In this way, the network transmission resources consumed by frequently sending the program code or the execution characteristics of the program code by the host computer to the cluster antivirus device in Embodiments 2 and 3, and therefore, the detection efficiency is improved.

The local database of the host computer according to this embodiment of the present invention may be used to detect whether the program code in the virtual machines is malicious code. In this way, utilization of the data in the local database is improved, and additionally the update and upgrade solution is more convenient. Therefore, the problem that update and maintenance are complex in the prior art because antivirus software is installed in each of the virtual machines is prevented.

Embodiment 6

Figure 6A:
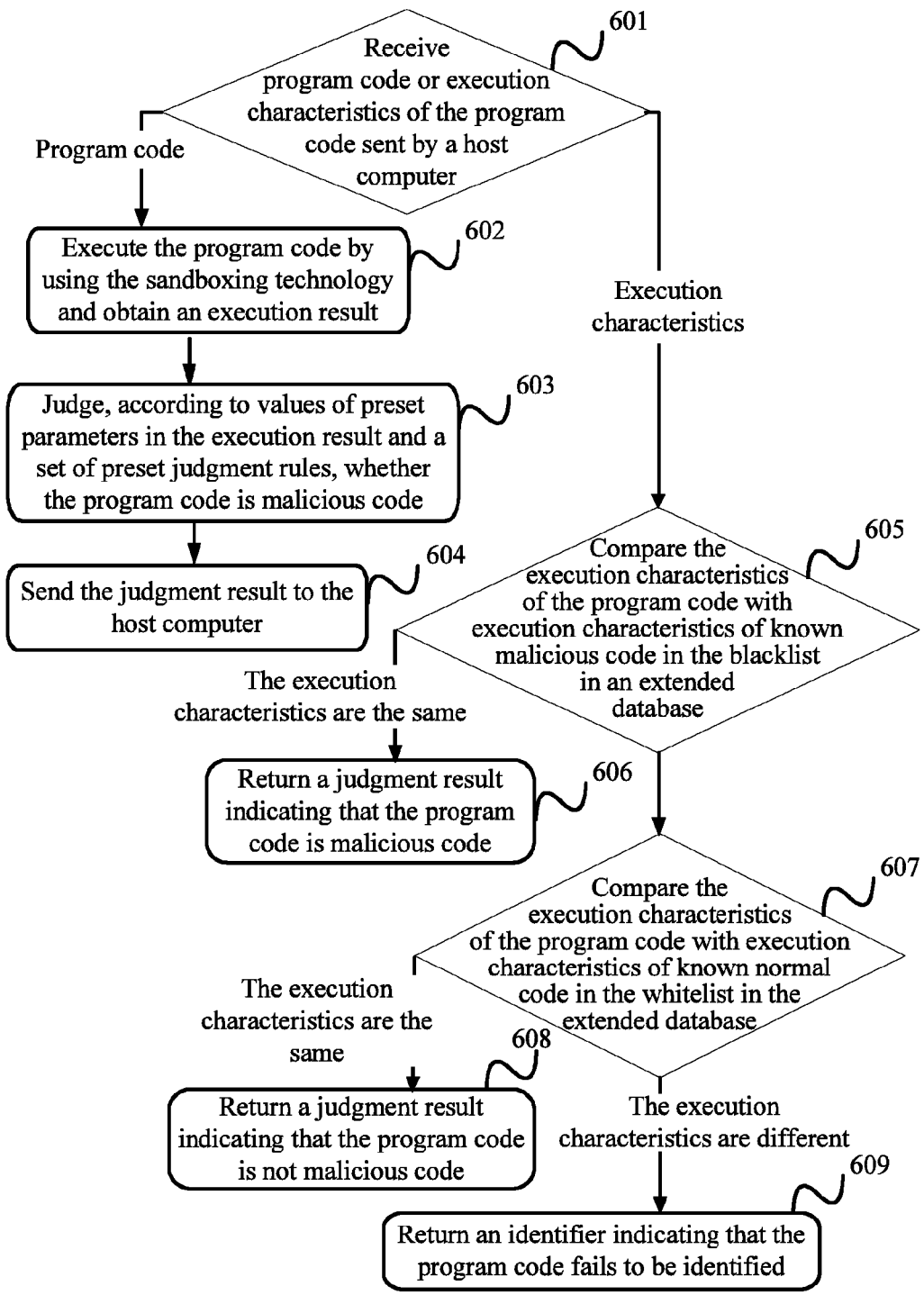
FIG. 6A is a flowchart of a method for detecting malicious code according to Embodiment 6 of the present invention.

Referring to FIG. 6A, this embodiment of the present invention describes the method for detecting malicious code from the perspective of a cluster antivirus device.

Step 601: The cluster antivirus device receives program code or execution characteristics of the program code sent by a host computer; if the program code is received, step 602 is performed; if the execution characteristics of the program code are received, step 605 is performed.

Step 602: The cluster antivirus device executes the program code by using the sandboxing technology or other technologies similar to sandboxing, and obtains an execution result; and step 603 is performed.

Step 603: The cluster antivirus device determines, according to values of preset parameters in the execution result and a set of preset determination rules, whether the program code is malicious code, where the determination rules include a threshold determination range for at least one of the preset parameters.

Specifically, the preset parameters may be environment parameters of the sandbox (for example, some parameters in a registry) or the number of files within a predetermined range (for example, a folder in a predetermined path), a file size, a file link, and read-write rights to a file. For example, one preset rule is: R1=(if path=/boot/xen.gz, operation=writing or changing link, then Malware), that is, "during execution of program code, if an operation of modifying the file content or changing the file link is performed for a file named xen.gz in the path /boot/, the program code is malicious code". After the program code is executed in the sandbox, if the execution result complies with rule R1, it indicates that the program code is malicious code.

Optionally, the preset rule is obtained by analysis according to the execution result of the known malicious code.

Step 604: The cluster antivirus device sends the determination result obtained in step 603 to the host computer.

Step 605: The cluster antivirus device compares the execution characteristics sent by the host computer with execution characteristics of known malicious code in the blacklist in an extended database; if the execution characteristics are the same as the execution characteristics of the known malicious code in the blacklist, step 606 is performed; if the execution characteristics are different, step 607 is performed.

Step 606: The cluster antivirus device returns a determination result indicating that the program code is malicious code.

Step 607: The cluster antivirus device compares the execution characteristics sent by the host computer with execution characteristics of known normal code in the whitelist in the extended database; if the execution characteristics are the same as the execution characteristics of the known normal code in the whitelist, step 608 is performed; if the execution characteristics are different, step 609 is performed.

Step 608: The cluster antivirus device returns a determination result indicating that the program code is not malicious code.

Step 609: The cluster antivirus device returns an identifier indicating that the returned program code fails to be identified.

It should be noted that the solution, disclosed in steps 601-604, of determining whether the program code in the host computer is malicious code by using the sandboxing technology may be implemented independently of the solution, disclosed in step 601 and steps 605-609, of determining whether the program code in the host computer is malicious code by querying the extended database.

Figure 6B:
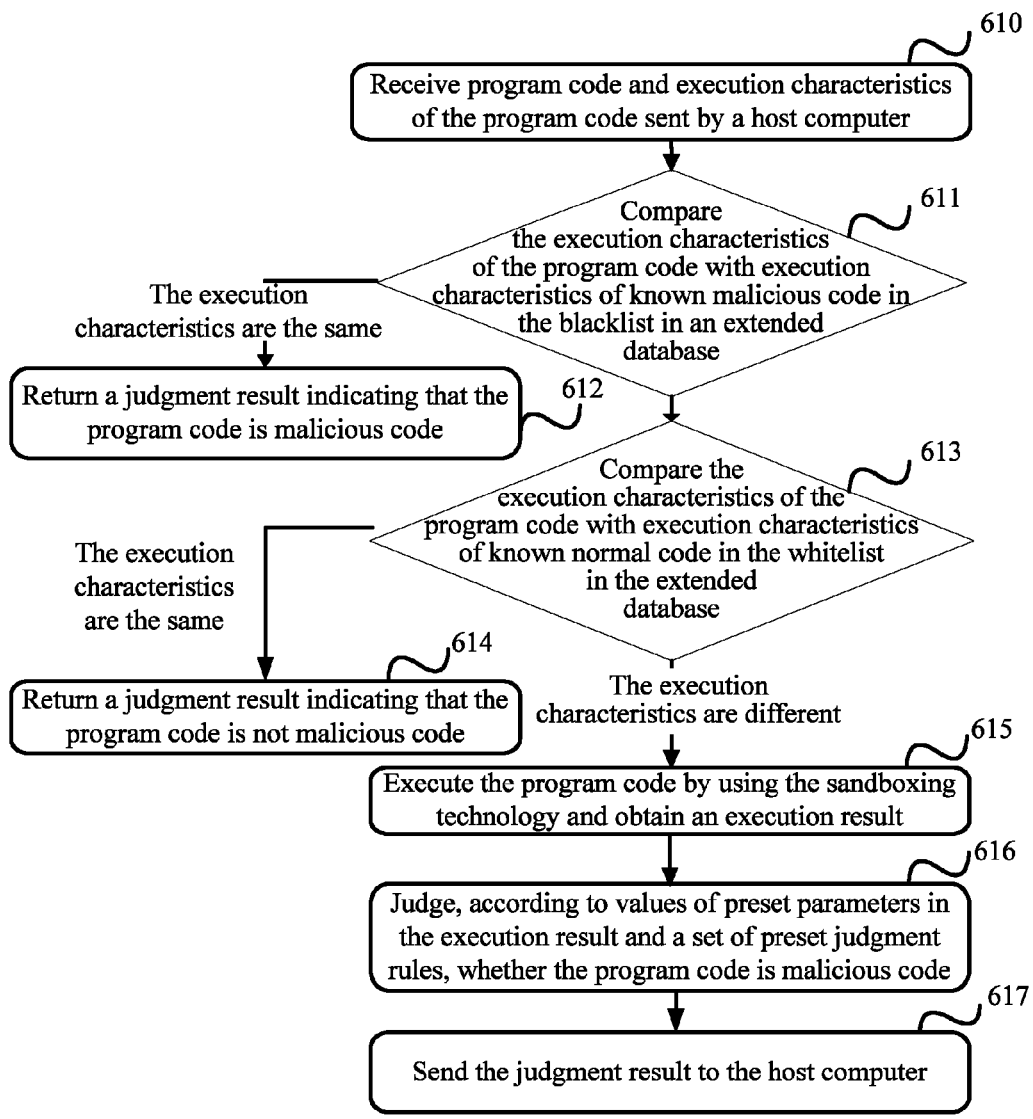
FIG. 6B is a flowchart of another method for detecting malicious code according to Embodiment 6 of the present invention.

Referring to FIG. 6B, the method for detecting malicious code illustrated in FIG. 6A according to this embodiment of the present invention may also be adjusted as follows:

Step 610: The cluster antivirus device receives program code and execution characteristics of the program code that are sent by the host computer.

Step 611: The cluster antivirus device compares the received execution characteristics with execution characteristics of known malicious code in the blacklist in an extended database; if the execution characteristics are the same as the execution characteristics of the known malicious code in the blacklist, step 612 is performed; if the execution characteristics are different, step 613 is performed.

Step 612: The cluster antivirus device returns a determination result indicating that the program code is malicious code.

Step 613: The cluster antivirus device compares the execution characteristics sent by the host computer with execution characteristics of known normal code in the whitelist in the extended database; if the execution characteristics are the same as the execution characteristics of the known normal code in the whitelist, step 614 is performed; if the execution characteristics are different, step 615 is performed.

Step 614: The cluster antivirus device returns a determination result indicating that the program code is not malicious code.

Step 615: The cluster antivirus device executes the program code by using the sandboxing technology, and obtains an execution result; step 616 is performed.

Step 616: The cluster antivirus device determines, according to values of preset parameters in the execution result and a set of preset determination rules, whether the program code is malicious code, where the determination rules include a parameter value range for at least one of the preset parameters.

Step 617: The cluster antivirus device sends the determination result obtained in step 616 to the host computer.

In the solution illustrated in FIG. 6A, the data volume in single transmission between the host computer and the cluster antivirus device is small, but the number of interactions is large. In the solution illustrated in FIG. 6B, the data volume in single transmission between the host computer and the cluster antivirus device is large, but the number of interactions is reduced. During implementation, a solution may be selected flexibly according to the actual network conditions.

Optionally, in step 602 illustrated in FIG. 6A or step 615 illustrated in FIG. 6B, the cluster antivirus device executes the program code by using the sandboxing technology. The specific mode for obtaining the execution result includes but is not limited to any one or combination of the following modes:

Mode 1: The program code is executed in the pre-constructed first sandbox for simulating an environment of a virtual machine supervisor, and a security state report of the first sandbox is obtained after the program code is executed. According to mode 1, behaviors of transmitting malicious code by the virtual machine using the host computer may be detected.

Mode 2: The program code is executed in the second sandbox pre-constructed for simulating an environment of a virtual machine, and a security state report of the second sandbox is obtained after the program code is executed. According to mode 2, the running status of the malicious code in the virtual machine or hardware devices corresponding to the virtual machine may be obtained.

The method for detecting malicious code according to this embodiment of the present invention is capable of using the performance advantage of a distributed computing system of the cluster antivirus device, and comparing the execution characteristics of the program code sent by the host computer with the execution characteristics of known malicious code in an extended database to determine whether the program code is malicious code; or executing the program code sent by the host computer by using the sandboxing technology in a virtualization manner, and determining whether the program code sent by the host computer is malicious code according to the execution result. In this way, the detection accuracy is improved.

Embodiment 7

Figure 7:
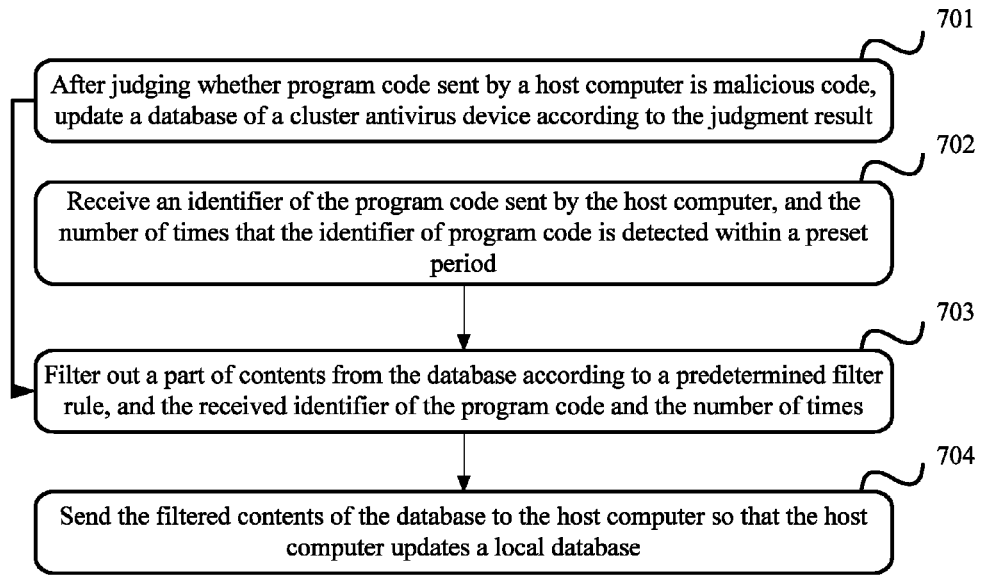
FIG. 7 is a flowchart of a method for updating a database in a cluster antivirus device according to Embodiment 7 of the present invention.

FIG. 7 shows an update mode of a database of a cluster antivirus device provided in this embodiment of the present invention.

Step 701: After determining, according to an execution result by using the sandboxing technology, whether program code sent by a host computer is malicious code, update a database of a cluster antivirus device according to the determination result.

The cluster antivirus device adds the identifier of the program code and the corresponding execution characteristics to a blacklist in the database when determining that the program code is malicious code.

Optionally, the cluster antivirus device adds the identifier of the program code and the corresponding execution characteristics to a whitelist in the database when determining that the program code is not malicious code.

Step 702: Receive the identifier of the program code, and the number of times that the identifier of the program code is detected within a preset period, which are sent by the host computer.

Step 703: Filter out a part of contents from the database according to a predetermined filter rule, and the received identifier of the program code and the number of times, where the filter rule includes a statistical indicator determination threshold, and the value of the statistical indicator may be determined according to the identifier of the program code and the number of times that the identifier of the program code is detected within the preset period.

Step 704: Send the filtered contents of the database to the host computer to update a local database.

Figure 8:
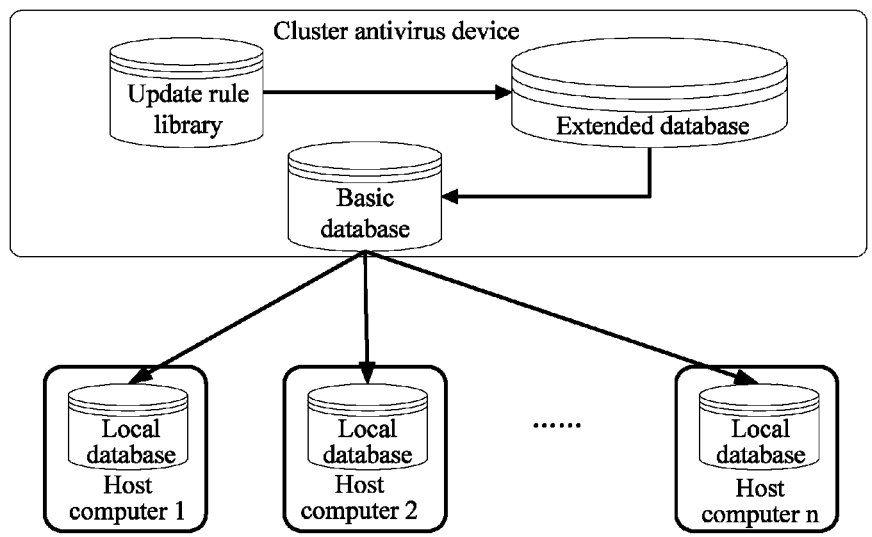
FIG. 8 is a schematic architecture diagram of a database in a cluster antivirus device according to Embodiment 7 of the present invention.
Figure 9:
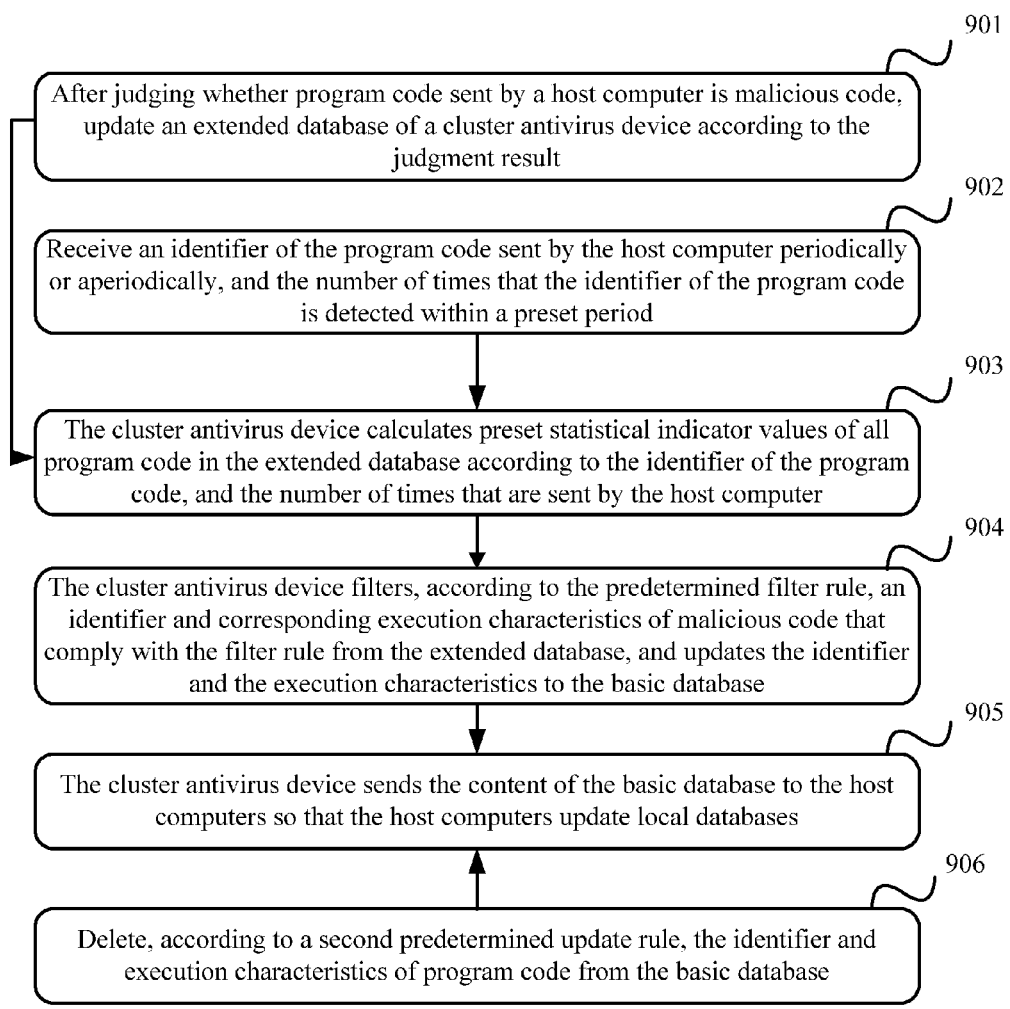
FIG. 9 is a detailed flowchart of a method for updating a database in a cluster antivirus device according to Embodiment 7 of the present invention.

This embodiment of the present invention further provides a specific architecture of a database in the cluster antivirus device, as shown in FIG. 8. The database of the cluster antivirus device includes an update rule library, an extended database, and a basic database, where at least one update rule is stored in the update rule library. FIG. 9 shows the process of forming an extended database and a basic database.

Step 901: The cluster antivirus device executes the program code sent by the host computer by using the sandboxing technology, and updates the extended database after determining, according to the execution result, whether the program code is malicious code (for the specific implementation of executing the program code by using the sandbox and determining, according to the execution result, whether the program code is malicious code, reference may be made to the description in Embodiment 6).

Optionally, the cluster antivirus device adds the identifier of the program code and the corresponding execution characteristics to a blacklist in the extended database when determining that the program code is malicious code.

Optionally, the cluster antivirus device adds the identifier of the program code and the corresponding execution characteristics to a whitelist in the extended database when determining that the program code is not malicious code.

Step 902: Receive an identifier of the program code and the number of times that the identifier of the program code is detected within a preset period, which are sent by the host computer periodically or aperiodically.

Optionally, the cluster antivirus device may also obtain additional information such as an identifier of the host computer, and sending time from the header of a data packet that is sent by the host computer and carries the identifier of the program code and the number of times that the identifier of the program code is detected.

Step 903: The cluster antivirus device calculates preset statistical indicator values of all program code in the extended database according to the identifier of the program code, and the number of times that are sent by the host computer.

Optionally, the statistical indicator includes the total number of times that the malicious code is detected by the host computers (which may also be understood as the total number of times that the malicious code infects the virtual machines), or the speed at which the malicious code is detected by the host computers (which may also be understood as the speed at which the malicious code infects the virtual machines), the details about detection of the malicious code by different host computers (which may also be understood as the universality of infection of the virtual machines by the malicious code, that is, a transmission range), the time when the malicious code is detected by the virtual machines, and the time when the malicious code is detected by the first host computer (which may also be understood as the time when the malicious code infects the virtual machines for the first time).

Step 904: The cluster antivirus device filters, according to the predetermined filter rule, an identifier and corresponding execution characteristics of malicious code that comply with the filter rule from the extended database, and adds the identifier and the execution characteristics to the basic database, where the filter rule includes at least one statistical indicator determination threshold.

The following uses examples to describe the filter rule.

1. Filter rule R11 set according to the total number of times that the malicious code is detected by the host computers: if the total number of times that the malicious code is detected exceeds 1000, the identifier and execution characteristics of the malicious code are added to the basic database.

2. Filter rule R12 set according to the speed at which the malicious code is detected by the host computers: if the speed at which the malicious code is detected exceeds 500 times per day, the identifier and execution characteristics of the malicious code are added to the basic database. Using this filter rule, the cluster antivirus device can filter out the malicious code transmitted at a high speed.

3. Filter rule R13 set according to the details about detection of the malicious code by different host computers: if the malicious code is detected by over 80% of the host computers, the identifier and execution characteristics of the malicious code are added to the basic database. Using this filter rule, the cluster antivirus device can filter out the malicious code transmitted within a large range.

4. Filter rule R14 set according to the time when the malicious code is initially detected by the host computer: if the duration between the time when the malicious code is initially detected and the current time exceeds one month (that is, the malicious code has infected the host computer for over one month), the identifier and execution characteristics of the malicious code are added to the basic database. Using this filter rule, the cluster antivirus device can filter out the malicious code that has infected the host computer for a long time.

Step 905: The cluster antivirus device sends the content of the basic database to the host computers so that the host computers update local databases.

Optionally, to effectively control capacities of the local databases of the host computers and save storage resources of the host computers, before step 904, the method further includes:

Step 906: Delete, according to a predetermined update rule, the identifier and execution characteristics of the program code that comply with the update rule from the basic database, where the update rule includes at least one statistical indicator determination threshold.

The following uses examples to describe the update rule.

1. Update rule R21 set according to the severity that the virtual machines are infected recently by the malicious code: if the number of times that the malicious code infects the virtual machines within a recent preset period is smaller than the preset number of times (for example, 10 or 100 times), the identifier and corresponding execution characteristics of the malicious code are deleted from the blacklist in the basic database.

2. Update rule R22 set according to the range where the virtual machines are infected recently by the malicious code: if the number of virtual machines infected by the malicious code within a recent preset period is smaller than the preset number (for example, 10 or 100), the identifier and corresponding execution characteristics of the malicious code are deleted from the blacklist in the basic database.

The number of virtual machines infected by the malicious code within the recent preset period may be determined according to the time when the program code and the number of times that are sent by the host computer, and the identifier of the host computer.

3. Update rule R23 set according to the duration when the malicious code is in the inactive state: if the malicious code does not appear again in any virtual machine within a recent preset period (for example, three months or one year), the identifier and corresponding execution characteristics of the malicious code are deleted from the blacklist in the basic database.

According to the update solution provided in this embodiment of the present invention, the database content with a high detection rate is selected from the database of the cluster antivirus device, and the local database of the host computer is updated according to the filtered database content. In this way, the probability that the host computer is capable of determining whether the program code executed in the virtual machine is malicious code according to the local database is increased; the number of times that the program code or the execution characteristics of the program code are sent to the cluster antivirus device for determination is reduced. This reduces the occupied transmission bandwidth between the host computer and the cluster antivirus device, shortens the determination time, and enhances the determination efficiency.

Embodiment 8

Figure 10:
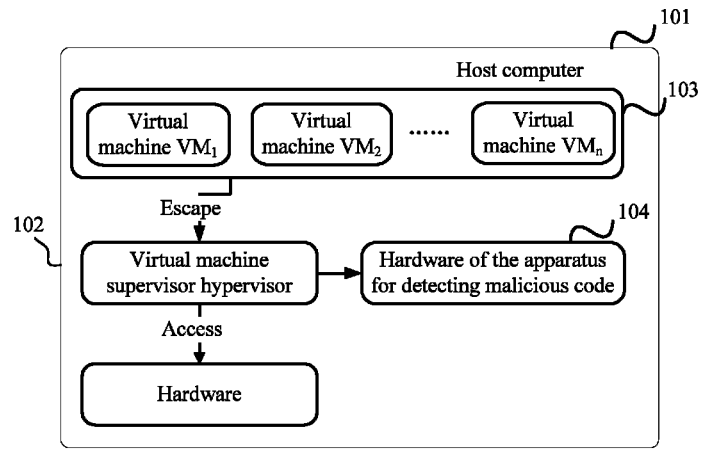
FIG. 10 is a schematic structural diagram of a host computer according to Embodiment 8 of the present invention.

Referring to FIG. 10, this embodiment of the present invention provides a host computer 101, including a virtual machine supervisor 102 and at least one virtual machine 103, and further including an apparatus 104 for detecting malicious code.

The apparatus 104 for detecting malicious code is configured to: monitor execution of an instruction in the virtual machine supervisor 102 of the host computer 101, where the instruction is generated in escape mode when a read-write request generated during execution of program code in the virtual machine 103 of the host computer is delivered to the virtual machine supervisor; obtain execution characteristics of the program code according to execution of the instruction; and compare the execution characteristics obtained by the obtaining unit with pre-stored execution characteristics of known malicious code, and determine that the program code is malicious code when the obtained execution characteristics and the pre-stored execution characteristics are the same.

Figure 11:
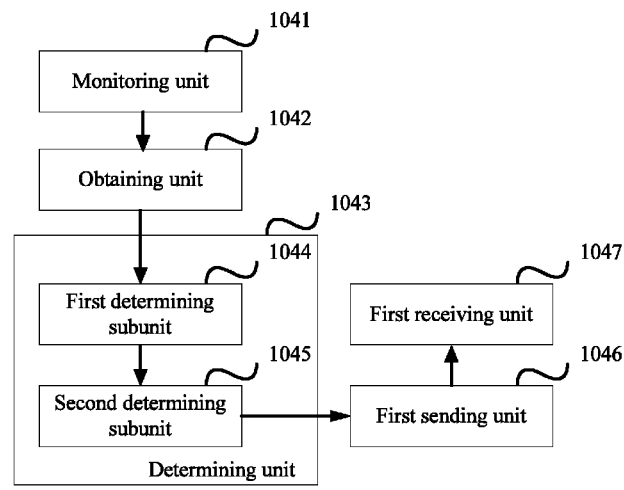
FIG. 11 is a schematic structural diagram of an apparatus for detecting malicious code according to Embodiment 8 of the present invention.

Correspondingly, an embodiment of the present invention further provides an apparatus for detecting malicious code, whose schematic structural diagram is shown in FIG. 11. The apparatus includes a monitoring unit 1041, an obtaining unit 1042, and a determining unit 1043.

The monitoring unit 1041 is configured to monitor execution of an instruction in a virtual machine supervisor of a host computer, where the instruction is generated in escape mode when a read-write request generated during execution of program code in a virtual machine of the host computer is delivered to the virtual machine supervisor.

The obtaining unit 1042 is configured to obtain execution characteristics of the program code according to execution of the instruction obtained by the monitoring unit 1041.

The determining unit 1043 is configured to compare the execution characteristics obtained by the obtaining unit 1042 with pre-stored execution characteristics of known malicious code, and determine that the program code is malicious code when the obtained execution characteristics and the pre-stored execution characteristics are the same.

The apparatus for detecting malicious code further includes: a first sending unit 1046 configured to, when the determining unit 1043 determines that the execution characteristics are different, send the obtained execution characteristics to a cluster antivirus device, or send the program code to the cluster antivirus device; and a first receiving unit 1047 configured to receive a determination result returned by the cluster antivirus device about whether the program code is malicious code according to the execution characteristics sent by the first sending unit 1046, where the determination result is determined after the cluster antivirus device compares the execution characteristics with execution characteristics of known malicious code in a database of the cluster antivirus device; or receive a determination result returned by the cluster antivirus device about whether the program code is malicious code according to the program code sent by the first sending unit 1046, where the determination result is determined according to an execution result after the cluster antivirus device executes the program code by using the sandboxing technology.

Optionally, the determining unit 1043 in FIG. 11 specifically includes: a first determining subunit 1044 configured to compare the obtained execution characteristics with execution characteristics of known malicious code in a blacklist in a local database, and determine that the program code is malicious code when the obtained execution characteristics and the pre-stored execution characteristics are the same; and a second determining subunit 1045 configured to, when the first determining subunit 1044 determines that the execution characteristics are different, compare the obtained execution characteristics with execution characteristics of known normal code in a whitelist in the local database for a second time, and if the second comparison result indicates that the execution characteristics are the same, determine that the program code is not malicious code.

The first sending unit 1046 is further configured to, when the second determining subunit 1045 determines that the execution characteristics are different after the second comparison, send the obtained execution characteristics to a cluster antivirus device, or send the program code to the cluster antivirus device.

Figure 12:
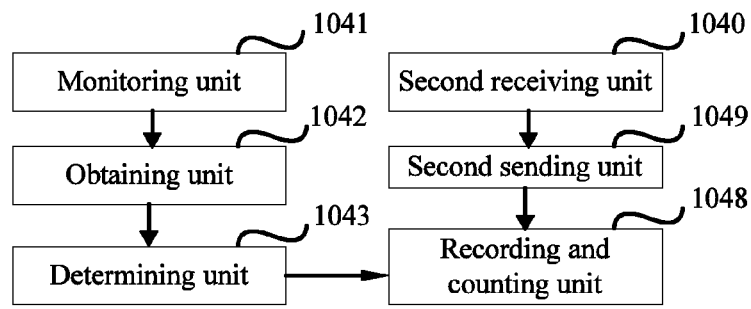
FIG. 12 is a schematic structural diagram of another apparatus for detecting malicious code according to Embodiment 8 of the present invention.

Optionally, referring to FIG. 12, the apparatus for detecting malicious code in FIG. 11 further includes a recording and counting unit 1048 configured to, when the determining unit 1043 determines that the program code is malicious code, record an identifier of the program code, and count, according to a record result, the number of times that the identifier of the program code is detected within a preset period; a second sending unit 1049 configured to send the identifier of the program code and the number of times that are obtained by the recording and counting unit 1048 to the cluster antivirus device; and a second receiving unit 1040 configured to receive a database content returned by the cluster antivirus device, and replace a content of a local database according to the received database content, where the received database content is determined by the cluster antivirus device according to the identifier of the program code and the number of times, and the received database content includes the execution characteristics of known malicious code.

Optionally, the first sending unit 1046 specifically includes a notifying subunit configured to instruct, by sending a notification message to an antivirus proxy in a virtual machine, the virtual machine to send the program code to the cluster antivirus device.

Or, the first sending unit 1046 specifically includes a first sending subunit, a first receiving subunit, and a second sending subunit, where the first sending subunit is configured to send a request message to the antivirus proxy in the virtual machine; the first receiving subunit is configured to receive a response message returned by the antivirus proxy in the virtual machine according to the request message; and the second sending subunit is configured to obtain program code from the response message, and send the obtained program code to the cluster antivirus device.

The apparatus for detecting malicious code according to the embodiment of the present invention may be integrated in a virtual machine supervisor of a host computer, or implemented using independent hardware or software modules.

This embodiment of the present invention provides a host computer, and an apparatus for detecting malicious code in the host computer. The apparatus monitors the instruction generated in escape mode in the virtual machine supervisor of the host computer, obtains the execution characteristics of the program code according to the instruction, compares the obtained execution characteristics with the pre-stored execution characteristics of known malicious code, and determines whether the program code is malicious code according to the comparison result. Compared with the solution of the prior art where antivirus software is installed in each virtual machine to detect malicious code, the solution provided in this embodiment improves the detection efficiency, reduces the storage resources in the host computer that are occupied by installing antivirus software in each virtual machine repeatedly, and the processing resources in the host computer that are occupied by running the antivirus software in each virtual machine.

Embodiment 9

Figure 13:
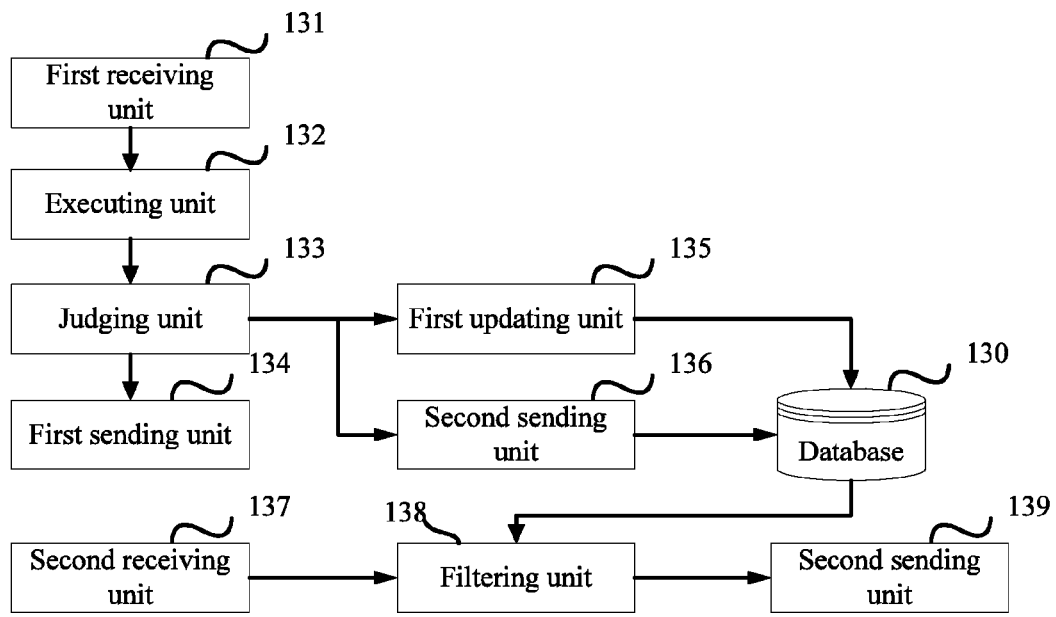
FIG. 13 is a schematic structural diagram of a cluster antivirus device according to Embodiment 9 of the present invention.

Referring to FIG. 13, this embodiment of the present invention provides an apparatus for detecting malicious code. The apparatus for detecting malicious code may be a cluster antivirus device. The apparatus includes a first receiving unit 131, an executing unit 132, a determining unit 133, and a first sending unit 134.

The first receiving unit 131 is configured to receive program code sent by a host computer.

The executing unit 132 is configured to execute, by using the sandboxing technology, the program code received by the first receiving unit 131, and obtain an execution result.

The determining unit 133 is configured to determine, according to values of preset parameters in the execution result and a set of preset determination rules, whether the program code is malicious code, where the determination rules include a threshold determination range for at least one of the preset parameters.

The first sending unit 134 is configured to send the determination result obtained by the determining unit 133 to the host computer.

Optionally, the executing unit 132 is specifically configured to execute the program code in a pre-constructed first sandbox for simulating an environment of a virtual machine supervisor, and obtain a security state report of the first sandbox after the program code is executed; and/or execute the program code in a pre-constructed second sandbox for simulating an environment of a virtual machine, and obtain a security state report of the second sandbox after the program code is executed.

Optionally, the cluster antivirus device further includes a database 130 including a blacklist, where the blacklist is used to store an identifier of known malicious code and corresponding execution characteristics, where, optionally, a whitelist in the database 130 is used to store an identifier of known normal code and corresponding execution characteristics; and a first updating unit 135 configured to add the identifier of the program code and the corresponding execution characteristics to the blacklist in the database when the determining unit 133 determines that the program code is malicious code.

Optionally, to improve the detection effect, the cluster antivirus device may further include a second updating unit 136 configured to add the identifier of the program code and the corresponding execution characteristics to the whitelist in the database when the determining unit 133 determines that the program code is not malicious code.

To timely update a local database of the host computer, the cluster antivirus device further includes: a second receiving unit 137 configured to receive the identifier of the program code and the number of times that the identifier of the program code is detected within a preset period, which are sent by the host computer; a filtering unit 138 configured to filter out a part of contents from the database 130 according to the identifier of the program code and the number of times received by the second receiving unit 137, and a predetermined filter rule in the cluster antivirus device, where the filter rule includes a statistical indicator determination threshold, and the value of the statistical indicator is determined according to the identifier of the program code and the number of times; and a second sending unit 139 configured to send the contents filtered out by the filtering unit 138 to the host computer to update a local database.

The cluster antivirus device provided in this embodiment of the present invention is capable of using the performance advantage of a distributed computing system, and comparing the execution characteristics of the program code sent by the host computer with the execution characteristics of known malicious code in an extended database to determine whether the program code is malicious code; or executing the program code sent by the host computer by using the sandboxing technology, and determining whether the program code sent by the host computer is malicious code according to the execution result. In this way, the detection accuracy is improved.

Embodiment 10

Figure 14:
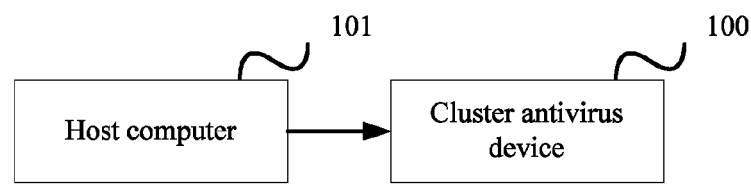
FIG. 14 is a schematic structural diagram of a system for detecting malicious code according to Embodiment 10 of the present invention.

Referring to FIG. 14, this embodiment of the present invention provides a system for detecting malicious code, including at least one host computer 101 described in Embodiment 8. Each host computer is configured to: capture an instruction in a virtual machine supervisor of the host computer, where the instruction is generated in escape mode when a read-write request generated during execution of program code in a virtual machine of the host computer is delivered to the virtual machine supervisor; obtain execution characteristics of the program code according to the instruction; and compare the obtained execution characteristics with pre-stored execution characteristics of known malicious code, and determine that the program code is malicious code when the obtained execution characteristics and the pre-stored execution characteristics are the same.

In addition, the system for detecting malicious code includes at least one cluster antivirus device 100.

The host computer 101 is further configured to compare the obtained execution characteristics with execution characteristics of known malicious code in a blacklist in a local database, and when the execution characteristics are different, send the program code or the execution characteristics to the cluster antivirus device 100 and receive a determination result returned by the cluster antivirus device about whether the program code is malicious code, where the determination result is determined after the cluster antivirus device compares the characteristics with execution characteristics of known malicious code in a database of the cluster antivirus device, or determined according to an execution result after the cluster antivirus device executes the program code by using the sandboxing technology.

Specifically, when the comparison result indicates that the execution characteristics are different, the host computer may compare the obtained execution characteristics with execution characteristics of known normal code in a whitelist in the local database for a second time; if the comparison result indicates that the execution characteristics at the second time are the same, the host computer determines that the program code is not malicious code; and if the execution characteristics at this time are different, the host computer sends the program code or the execution characteristics to the cluster antivirus device 100; or when the first comparison result indicates that the execution characteristics are different, the host computer may directly send the program code or the execution characteristics to the cluster antivirus device 100.

The cluster antivirus device 100 is configured to: receive the program code sent by the host computer 101, execute the program code by using the sandboxing technology, and obtain an execution result; determine, according to values of preset parameters in the execution result and a set of preset determination rules, whether the program code is malicious code, where the determination rules include a parameter value range for at least one of the preset parameters; and send the determination result to the host computer 101.

For the process in which the cluster antivirus device 100 executes the program code by using the sandboxing technology, and obtains the execution result, reference may be made to the description in Embodiments 6 and 9.

The system for detecting malicious code according to the embodiment of the present invention uses the performance advantage of a distributed computing system of the cluster antivirus device to improve accuracy of detecting malicious code in the host computer.

Persons of ordinary skill in the art may understand that all or a part of steps of the method according to the embodiments may be implemented by a program instructing relevant hardware. The program may be stored in a computer readable storage medium, such as a read only memory (ROM)/random access memory (RAM), a magnetic disk, or a compact disc-ROM (CD-ROM).

It will be apparent to persons skilled in the art that various modifications and variations can be made to the present invention without departing from the scope or spirit of the invention. In view of the foregoing, it is intended that the present invention cover modifications and variations of this invention provided they fall within the scope of the following claims and their equivalents.

What is claimed is:

1. A method for a host computer to detect malicious code, wherein the host computer runs a virtual machine supervisor to manage a plurality of virtual machines running on the host computer, the method being performed by the host computer by means of the virtual machine supervisor and comprising:
   converting, by the virtual machine supervisor, a read-write request delivered from a virtual machine running on the host computer into an instruction for accessing hardware devices of the host computer, wherein the read-write request is generated during execution of program code in the virtual machine delivering the read-write request;
   monitoring, by the virtual machine supervisor, execution of the instruction, and obtaining execution characteristics of the instruction;
   comparing, by the virtual machine supervisor, the obtained execution characteristics with pre-stored execution characteristics of known malicious code;
   determining, by the virtual machine supervisor, that the program code is malicious when the obtained execution characteristics and the pre-stored execution characteristics are the same; and
   generating, by the virtual machine supervisor, a prompt message to indicate to a user that the program code of the virtual machine is malicious.

2. The method according to claim 1, wherein the execution characteristics are selected from the group of: a content of the instruction, a behavior characteristic of the instruction during execution of the instruction to access a system file in the virtual machine supervisor, and a behavior characteristic of the instruction during execution of the instruction to access hardware devices.

3. The method according to claim 2, wherein the behavior characteristic of the instruction during execution of the instruction in the virtual machine supervisor comprises: modification of a content of a system file in the virtual machine supervisor, modification of a location of a system file in the virtual machine supervisor, or modification of parameter information of a system file in the virtual machine supervisor, and wherein the behavior characteristic of the instruction during execution of the instruction to access hardware devices comprises: a duration of access to storage space exceeding a first preset threshold, a duration of CPU usage exceeding a second preset threshold, or whether to read and write an input/output interface within a specified range.

4. The method according to claim 2, wherein when the execution characteristics comprise the content of the instruction, the step of obtaining the execution characteristics of the instruction comprises reading the content of the monitored instruction.

5. The method according to claim 2, wherein when the execution characteristics comprise the behavior characteristic of the instruction during execution of the instruction to access a system file in the virtual machine supervisor, the step of obtaining the execution characteristics of the instruction comprises monitoring a parameter input when a predetermined application programming interface (API) in the virtual machine supervisor is invoked by the instruction.

6. The method according to claim 2, wherein when the execution characteristics comprise the behavior characteristic of the instruction during execution of the instruction to access hardware devices, the step of obtaining the execution characteristics of the instruction comprises monitoring a parameter input when a predetermined API in the virtual machine supervisor is invoked by the instruction, or monitoring usage of storage resources or processing resources on the host computer during execution of the instruction.

7. The method according to claim 1, wherein when the obtained execution characteristics and the pre-stored execution characteristics are different, the method further comprises sending the program code to a cluster antivirus device, and receiving a determination result returned by the cluster antivirus device indicating whether the program code is malicious.

8. The method according to claim 1, wherein when the obtained execution characteristics and the pre-stored execution characteristics are different, the method further comprises:
   sending the obtained execution characteristics to a cluster antivirus device;
   receiving from the cluster antivirus device an identifier indicating a failure to identify the program code;
   sending the program code to the cluster antivirus device in response to receiving the identifier; and
   receiving a determination result returned by the cluster antivirus device indicating whether the program code is malicious.

9. The method according to claim 1, wherein after determining that the program code is malicious, the method further comprises:
   recording an identifier of the program code;
   counting, according to a record result, a number of times that the identifier of the program code has been detected within a preset period;
   sending the identifier of the program code and the number of times to a cluster antivirus device;
   receiving an updated database content returned by the cluster antivirus device; and
   replacing a content of a local malicious code database with the received updated database content, wherein the received updated database content comprises updated execution characteristics of known malicious code.

10. The method according to claim 1, wherein when the program code is malicious, the method further comprises impeding execution of the instruction converted from the read-write request.

11. A host computer comprising:
   a memory storing a program of a virtual machine supervisor for managing virtual machines running on the host computer; and
   a processor couple to the memory, the processor being configured to execute the program of the virtual machine supervisor to:
   convert a read-write request delivered from a virtual machine running on the host computer into an instruction for accessing hardware devices of the host computer, wherein the read-write request is generated during execution of program code in the virtual machine;

monitor execution of the instruction and obtain execution characteristics of the instruction;

compare the obtained execution characteristics with pre-stored execution characteristics of known malicious code;

determine that the program code is malicious when the obtained execution characteristics and the pre-stored execution characteristics are the same; and generate a prompt message to indicate to a user that the program code of the virtual machine is malicious.

12. The host computer according to claim 11, wherein when the obtained execution characteristics and the pre-stored execution characteristics are different, the processor further executes the program of the virtual machine supervisor to:

send the program code to a cluster antivirus device; and receive a determination result returned by the cluster antivirus device indicating whether the program code is malicious.

13. The host computer according to claim 11, wherein when the obtained execution characteristics and the pre-stored execution characteristics are different, the processor further executes the program of the virtual machine supervisor to:

send the obtained execution characteristics to a cluster antivirus device;

receive an identifier indicating a failure to identify the program code;

send the program code to the cluster antivirus device in response to receiving the identifier; and receive a determination result returned by the cluster antivirus device indicating whether the program code is malicious.

14. The host computer according to claim 11, wherein after determining that the program code is malicious, the processor is further configured to:

record an identifier of the program code;

count, according to a record result, a number of times that the identifier of the program code has been detected within a preset period;

send the identifier of the program code and the number of times to the cluster antivirus device;

receive an updated database content returned by the cluster antivirus device; and replace a content of a local malicious code database with the received updated database content, wherein the received updated database content comprises updated execution characteristics of known malicious code.

* * * * *